United States Patent [19]
Niileksela

[11] 3,786,587
[45] Jan. 22, 1974

[54] TROLLING LURE

[76] Inventor: Eino Ilmari Niileksela, Kruunukoankatu 1 B19, Helsinki, Finland

[22] Filed: Nov. 17, 1971

[21] Appl. No.: 199,409

[30] Foreign Application Priority Data
Nov. 18, 1970 Finland .............................. 3101/70

[52] U.S. Cl. .................................................. 43/35
[51] Int. Cl. ............................................ A01k 85/02
[58] Field of Search .................................. 43/35, 37

[56] References Cited
UNITED STATES PATENTS
1,479,652  1/1924  Cranstone .............................. 43/35
2,702,961  3/1955  Godbey .................................. 43/35

*Primary Examiner*—Antonio F. Guida
*Assistant Examiner*—Daniel J. Leach
*Attorney, Agent, or Firm*—Holman & Stern

[57] ABSTRACT

A trolling lure is disclosed having a pair of hooks hidden in the body of the lure. A special triggering mechanism is disposed in a chamber of the lure body and comprises a setting rod held in the set position by a pair of U-shaped safety springs under the combined effects of a setting spring and the resilient kneed arms of a forked spring attached to the fishing line, the arms passing through the bights of the safety springs and connected to the setting spring which is under compressive stress. The hooks are propelled from the lure under the action of a discharge spring which is released when the bights of the safety springs are separated due to the action of tightening the fishing line. The hooks are tensionally disposed within the interior of the lure body and fixed to a piston bearing on the discharge spring, so that when the discharge spring is released the piston moves longitudinally within the interior of the lure body and causes the hooks to be propelled from the lure.

3 Claims, 2 Drawing Figures

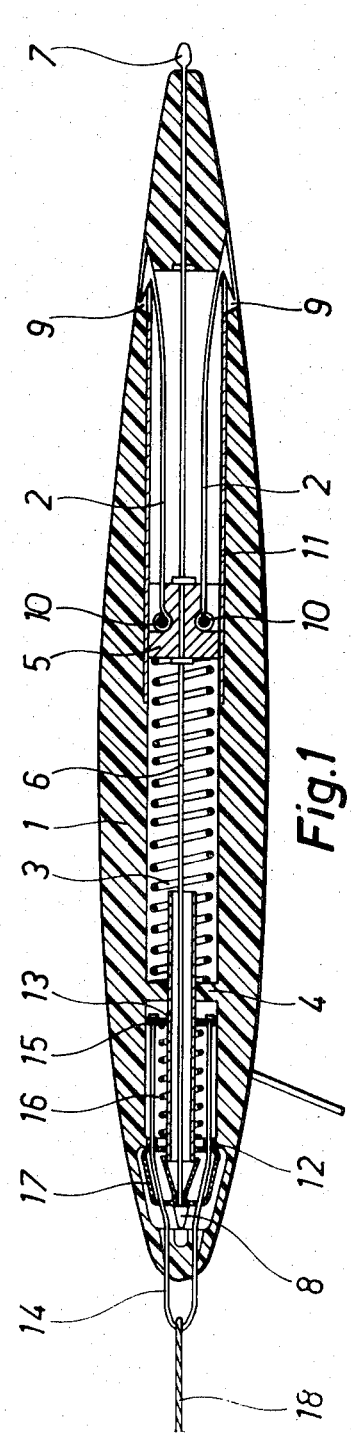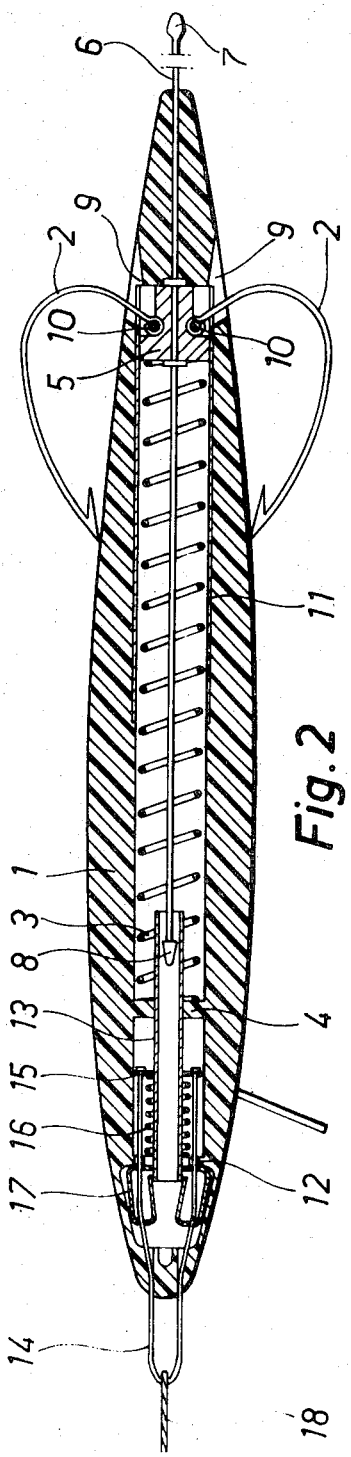

TROLLING LURE

BACKGROUND OF THE INVENTION

Trolling lures with hidden hooks in which the hooks are hidden inside the lure body are known. The advantage of such devices lies in the fact that the lure can be drawn in sea grass without the risk of the hooks getting entangled. In a trolling lure of the hidden hook-type the hooks are in a spring-loaded state such that immediately the fish is caught by the lure, the hooks are spring-released from the lure body to snare the fish. A drawback of these well-known trolling lures is the fact that the hooks may be discharged too early. This may happen when fishing with a casting lure, when the shock of dropping the lure onto the water surface prematurely releases the setting mechanism.

The purpose of the invention is to develop a trolling lure with hidden hooks of the above-mentioned type, without the above-mentioned drawbacks of the well-known lures. The trolling lure according to the invention operates successfully as a grass lure and as a casting lure, whereby it does not get entangled in grass and is not released prematurely when contacting the water surface after the cast. The invention therefore meets the requirements made on hidden hook-lures, grass lures and casting lures. The advantages of the trolling lure according to the invention are, however, not confined to the above devices. The invention also solves some other problems which have not been solved satisfactorily by prior art lures and important advantages are attained in comparison with well-known trolling lures.

A problem encountered in lures with hidden hooks is based upon the fact that the release of the hooks takes place by a mechanism in which the behavior of the fish is not observed, but which operates similar to the trigger mechanism in firearms. Very often the discharge mechanism of the hidden hook includes a trigger, which, when pressed, releases the hook restraining mechanism and the hidden hooks then spring from the body of the lure. Also the discharge mechanism, based upon the tightening of the fish line, operate in this way, that is, without paying attention to the behavior of the fish when biting. Being aware of this drawback, intensive investigations have been made on the basis of which a discharge mechanism has been developed according to the invention which takes into consideration the real behavior of the fish when getting caught by the lure. The mechanism operates in two steps, the automatic lure according to the instant invention being a double automaton.

Another problem of lures with hidden hooks is associated with the outward springing movement of the hooks which are hidden, in the lure body. Generally, the hooks spring from the lure backwards or obliquely backwards. This involves the drawback that this direction of movement may drive the fish away from the lure or result in the situation that the fish caught by the hooks easily frees itself from the hook and the lure. This drawback does not appear in the lure according to the invention which is characterized in that the movement of the hooks is arranged at least partly transversely and forward in relation to the body of the lure. Such a movement of the hooks does not drive the fish away but, on the contrary, draws it to the lure, so that the fish is securely fastened thereto. The movement of the hooks in the lure starts preferably in a transverse direction and then curves forwardly and is finally directed towards the lure body so that the fish are firmly held between the hooks and the body of the lure and cannot pull themselves therefrom due to the locking action of the hooks against the lure body.

The solving of the above-mentioned problems and the attaining of numerous advantages become more important when compared with known trolling lures with hidden hooks which have been invented, patented and constructed in numerous different models. In order to illustrate the prior art, reference is made to the following patents: Swedish patent 90,698, Norwegian patent 53,885, German patents 847,510 and 1,139,698 and the following U.S. Pats: 2,851,817, 3,117,389, 3,100,359, 2,768,463, 2,751,719 and 2,589,343.

Particularly the last-mentioned U.S. Pat. No. 2,589,343 describes a trolling lure with hidden hooks which are discharged and expand sideways. There is, however, the drawback that the hooks do not move in the direction of their ends and thus do not adequately secure the fish; on the contrary, they are of the kind which drive the fish away from the lure. Another drawback of the lure disclosed in the U.S. patent is that the hooks are too easily discharged when the lure meets the surface of the water. Furthermore, the trigger mechanism is to be compared with the trigger of a piston and is not designed so as to monitor the real behavior of the fish close to the lure. Another drawback may also be mentioned in that the lure body is, owing to the movement required by the hooks, open to the extent that it really does not contain a true hidden hook.

The effects of well-known trolling lures as well as problems associated with developing a trolling lure obviating these defects, have now been described. Furthermore, a brief description is presented as to how the invention solves these problems and provides a trolling lure which is to a noticeable degree more advantageous than well-known lures.

BRIEF DESCRIPTION OF THE DRAWINGS

The invention will now be described in greater detail with reference to the accompanying drawings, in which:

FIG. 1 shows the trolling lure according to an embodiment in longitudinal section and in the set position;

FIG. 2 shows the same as FIG. 1, the hooks, however, being discharged.

DETAILED DESCRIPTION OF A PREFERRED EMBODIMENT

The symbol 1 refers to the body of the trolling lure, which has an inner chamber in which are situated the hooks 2 and their trigger, discharge, setting and safety mechanism. The essential part of the discharge mechanism consists of the spring 3 which in FIG. 1 is pressed together between a stationary stop 4 and a movable piston 5. Fastened to the piston 5 is a setting rod 6 with a setting knob 7 in the rear end and a safety knob 8 in the front end. The mechanism provided in the tow end of the lure keeps the safety knob in place and also the piston 5 and the hooks 2 remain in place in the position shown in FIG. 1, spring loaded by the spring 3. As the safety knob 8 is released, in a way described in more detail later, the spring 3 is discharged and pushes the piston 5 backwards. The hooks 2 are then triggered from the body of the lure through the openings or apertures 9, the movement being in the beginning transverse and then forwards and finally again curved towards the lure body until the hooks 2 attain the position shown in FIG. 2. Then the hooks 2, together with the lure body 1, fully secure the fish and prevent it from getting loose from the lure. The above-mentioned unique movement of the hooks is possible because in the first place, the hooks are made of elastic spring steel and secondly, because the piston 5 is able to move so far backwards that the connecting points of the hooks to the piston, are positioned beyond the openings 9. The hooks are secured to the piston 5 such that the hook ends are provided with loops through which the piston tap 10 passes. In FIG. 2, the extreme position of the piston 5, the location of the openings 9 and the articulation of the hooks 2 by the tap 10 to the piston 5 are such, that the strain directed upon the hooks 2 cannot move the piston forwards and open the hooks. The whole above-described discharge mechanism is placed in a pipe or channel 11 which may be entirely closed or open at one side. This pipe 11 is situated inside the chamber of the body of the lure 1, but when using a lure of the natural fish-type the pipe 11 can be pushed into the bait fish. The mechanism pipe 11 of metal is made rustproof, and the body 1 may be of wood or plastic. The trigger, setting and safety mechanism in the tow end of the lure is described in the following:

In addition to the stationary partition 4 the inner chamber comprises a stationary wall 12 and, supported by these walls 4 and 12, the setting rod 6 is enveloped by a thin pipe 13. The forked spring 14, made of steel wire, is positioned with its base portion projecting from the body of the lure. Both arms of the spring 14 which have outwardly off-set branches, pass through the body of the lure and the partition 12 and finally through the bottom plate 15, behind which the expanded portions of the arms are fastened. Supported by the bottom plate 15 is a setting spring 16 one end of which rests on the partition 12. In order to set the lure so that it discharges in the manner illustrated in FIG. 2, the setting knob 7 at the drag end of the lure is pressed to bring the setting rod 6 forwards into the lure, so that the setting rod 6 moves and is guided by the pipe 13. The setting rod 6 which is secured to the piston 5, causes the piston 5 to move ahead also, and the discharge spring 3 is compressed thereby. This continues until the safety knob 8 snaps into the safety position in the space between the safety springs 17. The springs 17 are flat springs bent into a U-shape, which are compressed with a corner between the bight and one leg of each spring disposed behind the safety knob 8. In the position shown in FIG. 1 the safety knob 8 has snapped in front of the bights of the safety springs 17 and the lure is set in the discharge position and secured thereto. As is evident from the following passages this position of readiness is entirely different to that in well-known lures, where the striker mechanism depends on a sensitive trigger.

The line 18 is fastened to the base end of the forked spring 14. When operating a lure which is in the state of readiness according to FIG. 1, it can be drawn in the grass and thrown without the mechanism being prematurely discharged. Only when the fish is caught by the lure and the line 18 tightens, then the trigger mechanism begins to function. This takes place as follows: When the line 18 draws the forked spring 14 out from the lure body 1 the kneed branches of the spring 14, which are passed through openings in the bights of the flat springs 17, separate the engaging corners of the flat springs thus opening the space therebetween to release the safety knob 8. Simultaneously, the ends of the branches of the forked spring 14 push the bottom plate 15 forwards, so that the setting spring 16 becomes compressed. It is noticed that the safety of the trigger depends on the resisting force of the setting spring 16 and on the resisting force of the safety springs 17. The yielding of the safety springs 17 is influenced by the shape of the expanded arms of the forked spring at this point and by their resilience. So the combined effect of these elements guarentees that the fish are caught in a natural manner, since the lure design causes the safety springs 17 to be separated so that the safety knob 8 becomes free, the spring 3 moves the piston 5 backwards and the hooks 2 emerge from the openings 9 in the lure body 1. Only the first part of the movement of the hooks is similar to that known earlier but thereafter, with the piston 5 moving more and more backwards, the movement of the hooks is transformed into a curving movement, so that when the piston 5 passes the openings 9, the ends of the hooks are moving towards the lure body, and the position shown in FIG. 2 is attained, where the hooks are locked and the fish is secured to the lure.

The present lure thus comprises in addition to the ordinary discharge spring 3 a trigger spring 16 functioning in the opposite direction. This new mechanism guarantees that the discharge takes place in the mouth of the fish. This invention and its mechanism may therefore be described as a double automaton. The mechanism starts the automatic function only when the fish takes the lure in its mouth and even then the function may start only when both springs, discharge spring 3 and setting spring 16, permit each other to be in a state of readiness. The safety of operation and setting are further improved due to the pressure of the safety springs 17. A thin pipe 13 guides the setting rod 6 and the safety knob 8 during setting of the lure and protects the safety knob 8 when the lure is discharged. Using the trolling lure according to this invention it has been found that much better catches can be affected since there are no outer hooks visible that would disturb the appetite of the fish. Furthermore, the fish is secured to the lure in an improved manner and held there owing to the special movement of the hooks.

The invention is, of course, not confined to the construction illustrated by the drawings but it can be varied in many ways within the scope of the following claims. The self-acting lure according to the invention can be applied to various cases. It can be easily manufactured and is most effective in use. It does not get entangled in incidental obstacles and prevents the fish, after being caught, from getting loose. Good catches have been also made using the present trolling lure in grassy waters, even in times when predatory fishes have not been present.

What is claimed is:

1. A trolling lure comprising an elongated body portion having a tow end and a drag end and a hollow chamber in the interior of said body portion extending substantially from the tow end to the drag end thereof; hook elements having hooked and unhooked ends and normally tensionally disposed in the chamber, the hooked ends being associated with apertures in the body portion communicating with the interior of the chamber, the unhooked ends being pivotally connected to a piston in said chamber; a setting rod for setting the lure extending through said chamber from the tow end to the drag end of said body portion and fixedly connected to said piston, one end of said rod projecting from said body portion at the drag end thereof and having a setting knob affixed thereto; a first spring means including a pair of springs each bent into a U-shape and relatively disposed to provide a space therebetween, and rigidly housed in said chamber at the tow end thereof, the other end of said rod having a safety knob which engages the bight of said first spring means when said setting rod sets the lure; a second spring means disposed at the tow end of said body portion and providing a towing point for said lure, said second spring means acting to close the space between the bights of said first spring means to bias the first spring means against said safety knob and said setting rod in the set position of the lure; a third spring means in said chamber connected to said second spring means and urging said bight to hold said safety knob and said setting rod in the set position, and a discharge spring means in said chamber urging said piston in the direction of said drag end when said lure is in the set position so that when a pulling force is applied to said second spring means in a direction opposite to the direction in which said piston is urged by said discharge spring means, said bight releases the setting rod and the hooks are propelled from said apertures.

2. A trolling lure as claimed in claim 1 wherein said second spring means is a forked spring having arms with kneed portions which pass through the bights of said first spring means and are connected to said third spring means, so that when said pulling force is applied to said second spring means the kneed portions of said arms force the bights apart against the holding action of said third spring means.

3. A trolling lure as claimed in claim 2 wherein said piston and said hooks elements move in a pipe in said chamber which guides the hook elements and the piston when the hooks are propelled from the lure.

* * * * *